United States Patent [19]
Cullen et al.

[11] Patent Number: 5,776,343
[45] Date of Patent: *Jul. 7, 1998

[54] FLUOROPLASTIC APERTURED FILM FABRIC, STRUCTURES EMPLOYING SAME AND METHOD OF MAKING SAME

[75] Inventors: D. Timothy Cullen, Wilmington; Edward E. Hovis, Newark; Joseph V. Marra, Wilmington, all of Del.

[73] Assignee: Applied Extrusion Technologies, Inc., Peabody, Mass.

[*] Notice: This patent issued on a continued prosecution application filed under 37 CFR 1.53(d), and is subject to the twenty year patent term provisions of 35 U.S.C. 154(a)(2).

[21] Appl. No.: 510,723

[22] Filed: Aug. 3, 1995

[51] Int. Cl.$^6$ ..................................................... B01D 39/16
[52] U.S. Cl. .................. 210/483; 210/488; 210/489; 210/490; 210/491; 210/492; 210/503; 210/506; 55/514; 55/524; 264/171.1; 264/171.11; 264/171.17; 264/211.12; 264/DIG. 48; 156/167; 156/174; 156/180; 156/181; 156/182; 156/219; 156/220
[58] Field of Search .................... 264/127, 171.1, 264/171.11, 177.17, 211.12, DIG. 48, 466, 471, 639, 642, 650, 678; 425/404, DIG. 37, DIG. 119; 210/483, 488, 489, 490, 491, 492, 503, 504, 505, 506, 508; 55/514, 524; 156/167, 174, 180, 181, 182, 219, 220, 510

[56] References Cited

U.S. PATENT DOCUMENTS

| | | |
|---|---|---|
| 2,790,999 | 5/1957 | Peck et al. |
| 2,957,200 | 10/1960 | Pufahl et al. |
| 3,012,918 | 12/1961 | Schaar |
| 3,038,198 | 6/1962 | Schaar |
| 3,718,059 | 2/1973 | Clayton |
| 3,813,461 | 5/1974 | Murayama et al. |
| 3,953,566 | 4/1976 | Gore |
| 3,962,153 | 6/1976 | Gore |
| 3,979,494 | 9/1976 | Ericson |
| 4,194,041 | 3/1980 | Gore et al. |
| 4,298,719 | 11/1981 | Mizuno et al. |
| 4,317,792 | 3/1982 | Raley et al. |
| 4,519,969 | 5/1985 | Murakami |
| 4,615,853 | 10/1986 | Aoyama et al. |

(List continued on next page.)

*Primary Examiner*—W. L. Walker
*Attorney, Agent, or Firm*—Caesar, Rivise, Bernstein, Cohen & Pokotilow, Ltd.

[57] ABSTRACT

An apertured film extruded from a crystalline, thermoplastic, extrudable fluoroplastic material. The film includes spaced-apart strand segments defining apertures therebetween and has at least 10 strand segments per inch. The film has a thickness of 2–12 mils and a Frazier air permeability number in the range of 200–2,000. The invention includes a process for preparing an apertured thermoplastic film by a single-sided embossing method. The process includes the steps of extruding in the machine direction, a film of a molten, crystalline, thermoplastic, extrudable, fluoroplastic material. The molten extruded film is passed in the machine direction through the nip of two metal rollers. One of the rollers has a substantially smooth surface, having a convex configuration as viewed from a direction substantially parallel to the axis of the roll, such that the diameter in the center of the roll is in the range of 8–12 mils greater than the diameter at the ends of the roller for a 40 inch roller. The other roller includes a plurality of discrete, raised projections disposed in a pattern. Each of the projections terminates in a distal end. The ends are separated from each other and are completely surrounded by continuous surface regions located proximate of the distal ends. A sufficient pressure is applied at the nip to cause a plurality of small apertures and/or thin areas to be formed in the extruded film in substantially the same pattern as the pattern of discrete, raised projections of the other of the rollers. The film is stretched in both the cross-machine direction and in the machine direction to increase the open area of the apertures and cause the thin areas to open into apertures. The invention also includes a laminated structure.

13 Claims, 3 Drawing Sheets

U.S. PATENT DOCUMENTS

| | | |
|---|---|---|
| 4,667,001 | 5/1987 | Mizuno . |
| 4,707,314 | 11/1987 | Kawahigashi et al. . |
| 4,710,331 | 12/1987 | Nobuo et al. . |
| 4,806,303 | 2/1989 | Bianco et al. . |
| 4,882,113 | 11/1989 | Tu et al. . |
| 5,026,513 | 6/1991 | House et al. . |
| 5,082,616 | 1/1992 | White et al. . |
| 5,102,921 | 4/1992 | Harada et al. . |
| 5,167,890 | 12/1992 | Sasshofer et al. . |
| 5,207,962 | 5/1993 | Hovis et al. . |
| 5,217,666 | 6/1993 | Tamaru et al. . |
| 5,252,626 | 10/1993 | Yamada et al. . |
| 5,286,324 | 2/1994 | Kawai et al. . |
| 5,352,108 | 10/1994 | Kagawa et al. . |
| 5,552,100 | 9/1996 | Shannon et al. ................... 264/127 |

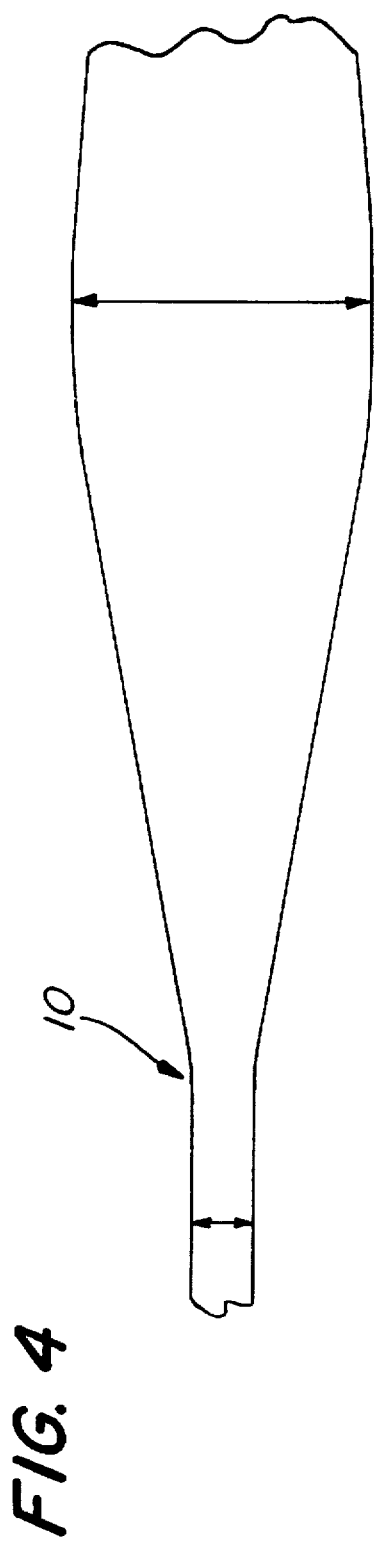
FIG. 4
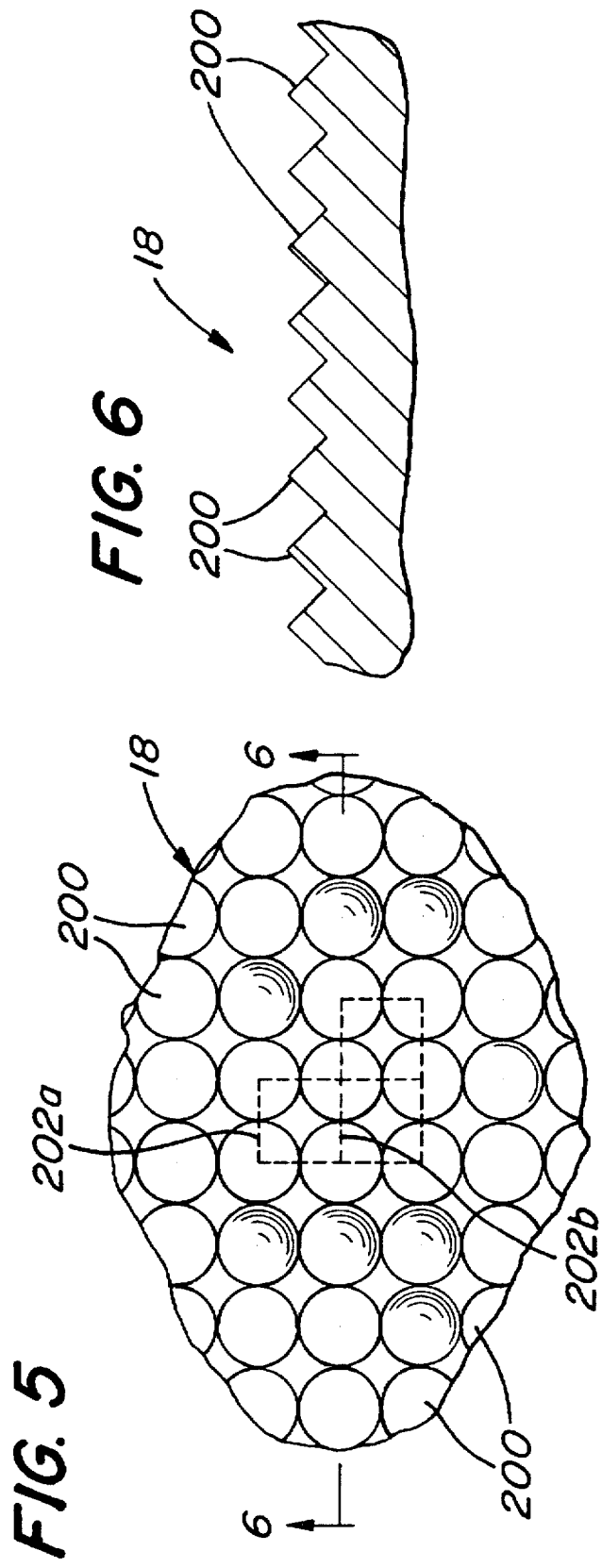
FIG. 6
FIG. 5

FLUOROPLASTIC APERTURED FILM FABRIC, STRUCTURES EMPLOYING SAME AND METHOD OF MAKING SAME

BACKGROUND OF THE INVENTION

It is well known to fabricate apertured thermoplastic webs or nets from a variety of materials and for a variety of different applications. In fact, the prior art is replete with disclosures relating to such webs and to processes for making them.

For a number of applications, an apertured net structure made from a fluoroplastic would be highly desirable, since fluoroplastics are very stable, are insoluble in a wide variety of materials, and also are very pure. For example, a fluoroplastic apertured web product would be highly desirable for use as a support member and separator for fragile, filter membranes in pleated filtration devices requiring a high degree of purity, and in particular, for applications wherein the filter membrane and support are exposed to high temperatures and strong solvents. The use of filter supports made from other polymers that are not as pure as the fluoroplastics (e.g., polypropylene) can result in materials being leached out of such polymers by strong solvents.

Fluoroplastics have more toughness or strength, are more chemically resistant, and have lower extractables than polypropylene or polyethylene.

In accordance with one specific application of the fluoroplastic nets of this invention, a filter membrane, which itself can be made from a fluoropolymer or a comparable resistive material, is sandwiched between apertured fluoroplastic net structures. Most preferably, the filter membrane is a thin membrane that is thinner than the fluoroplastic net structures. The composite structure is then pleated on conventional pleating equipment, and the pleated construction is then disposed in a cylindrical form and held between inner and outer casings of a filter cartridge. Pleating the membrane or media maximizes surface area in a small space and yields low pressure drop, thus improving flow rates and cycle life. The netting serves two purposes; it helps support the membrane or media through the delicate pleating operation, and it acts as a separator between the membrane or media layers. The separation is required to channel flow through the cartridge while keeping the membrane or media from touching itself. In use, the flow of fluid (liquid or air) is generally directed through the outer casing of the cartridge, through the laminate which includes the filter membrane, and out through the other casing.

Fluoroplastic net structures of this invention can be used for any number of applications wherein the need for a highly stable, temperature resistant, insoluble, and pure material is required or desired. Thus, in accordance with the broadest aspects of this invention, the use of the net structure is not a limitation on the present invention. In accordance with more specific aspects of this invention, a filter employing a composite of a filter membrane and a fluoroplastic net structure does constitute a part of the present invention.

It has been suggested in the prior art to use polyester net structures and PTFE web structures as supports for filter membranes. However, these latter structures are in the form of woven cloth members that are undesirably expensive to fabricate.

When the net structures of this invention are used in filter applications, it is preferred to form the nets with sufficiently large apertures to not impede the flow of a fluid through the composite filter structure. However, it is believed that a reduction of the flow rate would be an acceptable trade off for the enhanced cleanliness achieved in a filter system employing fluoroplastic apertured net structures of this invention.

Again, a supporting structure is required in filter cartridge applications to serve as a spacer and separator between membrane layers to improve fluid flow characteristics, channel the fluid flow, and prevent blinding of the membrane. Additionally, in pleated cartridge applications, a support structure is required to help assist the membrane or media through the pleating operation. A net structure is preferred over other non-woven alternatives because of its low surface to weight structure, hence the fluid will come in contact with less foreign material.

Prior to the present invention it is Applicants' understanding that extruded fluoroplastic apertured net structures have not existed, and indeed, prior to this invention applicants were not aware of any available technology for effectively forming such net structures. For example, there have been a variety of disclosures suggesting the use of pins to punch holes in a fabric as part of the process for forming an apertured net structure. However, the use of a pin-type process has not been found to be very reliable in dealing with conventional high strength materials such as high density polyethylene. Several people are successfully practicing making nets by punching HDPE and PP, however, they cannot make the fine geometry nets of the present invention and they generally have only a few pins per inch, and may actually have holes larger than one inch. Applicants have encountered difficulty in punching through these conventional high density materials at the required pin density for this invention and in many cases the piercing pins actually break off the roll during the punching operation. It has been determined that it is not easy to provide the necessary force to punch through the aforementioned dense materials while at the same time avoiding breakage of the pins. Applicants believe that the problems encountered with the puncturing of thin films to form apertured webs would be even more severe with the fluoroplastic polymers, which are even tougher and denser than both conventional high density polyethylene and other high density, highly crystalline polyolefins.

Moreover, the punching operation in a number of processes results in the removal of plastic material. In fact, it is applicants' understanding that as much as 30% of the original polymer has been required to be recycled as a result of a punching operation employed to form apertured nets. Problems of pin breakage and material waste and recycling have been encountered with polypropylene, high density polyethylene or both, materials which are not even as tough as the fluoroplastics employed in the present invention.

In addition to punching to achieve a porous film, the prior art is replete with a variety of alternative techniques. For example, patents known to Applicants reveal certain fluoro-containing film extrusions, which are porous as a result of sintering, mechanically weakened surfaces, permeable surfaces resulting from gaseous treatment and stretching, calendaring and the like. For filter support applications which are very sensitive to particulate contamination and extractables, it would appear that such sintered and/or porous films would be unsuitable. In addition, no single reference known to Applicants appeared to teach the multi-step process or product of U.S. Pat. No. 5,207,962, substantially utilized in the present invention, with the desired fluoro-containing polymeric films of the present invention. See for example, U.S. Pat. No. 5,352,108 which discloses a fluoroplastic film having 5 mm pores which are utilized as fresh fruit wrappers; U.S. Pat. No. 5,286,324 (Kawal) discloses a porous PETF and film forming polymer; U.S. Pat. No. 5,252,626 (Yamada) discloses the heat treatment of TFE resin to form a porous film; U.S. Pat. No. 5,217,666 (Tamaru) discloses a permeable, semi-sintered PTEF film; U.S. Pat. No. 5,082,616 (White) discloses a PVDF film by double bubble film extrusion; U.S. Pat. No. 5,026,513 (House) discloses a porous PTFE with fibrils; U.S. Pat. No. 4,882,113 (Tu) discloses an unsintered porous fluoropolymer and fluoroelastomers; U.S. Pat. No. 4,806,303 (Bianco) discloses a method of making perforated films; U.S. Pat. No. 4,710,331 (Nobuo) discloses a porous, sintered PTFE film; U.S. Pat. No. 3,953,566 (Gore) discloses a basic PETF porous form in example 10; U.S. Pat. No. 3,718,059 (Clayton) discloses a permeable thermoplastic film; U.S. Pat. No. 3,038,198 (Schaar) discloses a perforated thermoplastic film with polyvinyl fluoride (Kel-F film of monochlorotrifluoroethylene polymers); U.S. Pat. No. 3,012,918 (Schaar) discloses monochlorotrifluoroethylene polymers (Kel-F) films; U.S. Pat. No. 2,957,200 (Pufahl) discloses in column 1, lines 19–40, a method of making a thermoplastic net in a hexagonal embossed pattern; and U.S. Pat. No. 2,790,999 (Peck) discloses porous PETF films.

Other patents of general interest include the following: U.S. Pat. No. 5,167,890 (sintered film with PETF); U.S. Pat. No. 5,110,527 (porous PTEF); U.S. Pat. No. 5,102,921 (porous PTEF); U.S. Pat. No. 5,082,616 (double bubble blown film); U.S. Pat. No. 4,707,314 (sintered film with PETF); U.S. Pat. No. 4,667,001 (article and different process VIDF); U.S. Pat. No. 4,615,853 (calendared); U.S. Pat. No. 4,519,969 (stretched fluoro film); U.S. Pat. No. 4,317,792 (perforated film, not fluoro but thermoplastic); U.S. Pat. No. 4,298,719 (dielectric film of PVDF); U.S. Pat. No. 4,194,041 (sintered); U.S. Pat. No. 3,979,494 (plastic wrapping film with perforated wicket holes); U.S. Pat. No. 3,962,153 (Gore, stretched porous PETF); U.S. Pat. No. 3,953,566 (Gore, basic patent, stretching); U.S. Pat. No. 3,813,461 (gas permeable cells produced by biaxially stretching PETF); and U.S. Pat. No. 2,790,999 (porous PETF).

SUMMARY OF THE INVENTION

An apertured and oriented film is made by extrusion from a crystalline (partially crystalline) thermoplastic, extrudable fluoroplastic material. The film includes spaced-apart strand segments defining apertures therebetween and has at least 10 strand segments per inch. The film has a thickness of 2–12 mils and a Frazier air permeability number in the range of 200–2,000.

The invention includes a process for preparing an apertured thermoplastic film by a single-sided embossing method. The process includes the steps of extruding in the machine direction, a film of a molten, crystalline, thermoplastic, extrudable, fluoroplastic material. The molten extruded film is passed in the machine direction through the nip of two metal rollers. A first roller has a substantially smooth surface and a convex configuration when viewed from a direction substantially parallel to the axis of the roll. The convex nature should be sufficient to produce a film having a plurality of thin areas and/or holes when the film is biaxially oriented. The second roller includes a plurality of discrete, raised projections disposed in a pattern. Each of the projections terminates in a distal end. The distal ends are separated from each other and are completely surrounded by continuous surface regions located proximate of the distal ends. A sufficient pressure is applied at the nip between the two rollers to cause a plurality of small thin areas and/or holes to be formed in the extruded film. The apertured film is then stretched biaxially, i.e., in both the cross-machine direction and in the machine direction, to cause the thin areas and/or holes to open up to form apertures. The invention also includes a laminated structure.

DESCRIPTION OF THE DRAWINGS

Other objects and many attendant features of this invention will become readily appreciated as the same becomes better understood by reference to the following detailed description when considered in connection with the accompanying drawings wherein:

FIG. 4 is a fragmentary plan view showing the manner in which the web of the invention is stretched in the cross-machine direction in the portion of the apparatus shown in FIG. 2.

FIG. 5 is a partial plan view of the embossing roll employed to form apertures in the film in accordance with the process of this invention.

FIG. 6 is a sectional view taken along line 6—6 of FIG. 5.

FIG. 7 is a partial sectional view of a laminated film.

FIG. 8 is a partial sectional view of a pleated film.

DETAILED DESCRIPTION OF THE PREFERRED EMBODIMENTS

Figure 1:
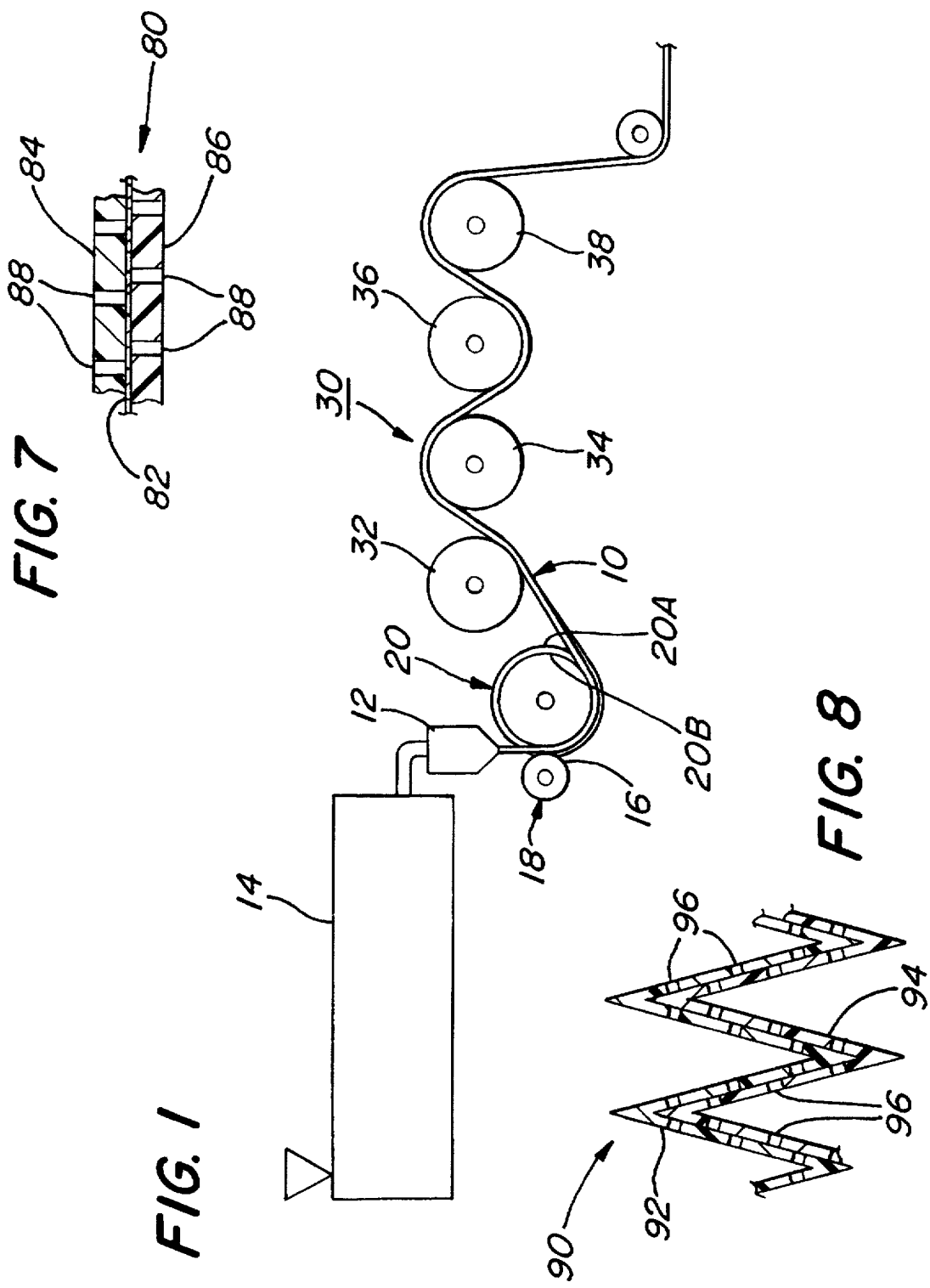
FIGS. 1–3 schematically show a continuous manufacturing line for carrying out the process of the present invention.

The problem encountered in forming extruded, fluoroplastic apertured net structures is that the fluoroplastic polymers are extremely hard and dense. In particular, the tensile modulus of the preferred fluoropolymer utilized in this invention, which is ECTFE (ethylene-chlorotrifluoroethylene), is approximately 240,000, as determined by ASTM test method D638. In comparison, the tensile modulus of high density polyethylene and similar polyethylene high density materials is generally in the range of 150,000, and is, in all cases, below 200,000.

Moreover, the density of the fluoroplastics used in this invention also are higher than the various polyolefins used to make supporting webs for thin filter membranes. In particular, the fluoroplastics used in this invention generally have a density of 1.6 grams/cubic centimeter (g/cm$^3$) and higher, whereas the polyolefins have a density of less than 1 gr/cm$^3$. This difference in density results from the fact that polyolefins, specifically polypropylene and polyethylene, are comprised of carbon and hydrogen atoms, while the fluoropolymers have substituted fluorine atoms, and/or chlorine atoms in some cases, for the hydrogen atoms resulting in less void volume within the crystal structure.

The fluoroplastic materials which are most desirable to use in this invention, are set forth in Table A, along with their respective tensile modulus, melting point and hardness values. In Table A, the fluoroplastics are listed in their order of preference, with ECTFE being the most preferred material. This preferential order is based upon the extrudability, crystallinity and purity of the materials as described in the literature, however Applicants' experience with the resins listed in Table A is based only upon experience with ECTFE, although the other resins are predicted to work as set forth herein. To practice the present invention, one needs to have a uniform polymer melt which is embossed as it is cooled. As a class of polymers, fluoropolymers have very high specific gravities (>2.0), while other thermoplastics typically have specific gravities of 0.9–1.7.

Other polymers which may be utilizable with the present invention, but which have not been tried, are PTFE and PCTFE. Polychlorotrifluoroethylene (PCTFE) has a tensile modulus of 150-300 mpsi, a melting point of 425° F. and a hardness of R75-112; D80; (poly)tetrafluoroethylene (TFE) has a tensile modulus of 80, a melting point of 621° F. and a hardness of D50. However, since these two polymers are available only as high molecular weight grades, it is thus believed they may not be extrusion processible or moldable in accordance with the present invention. Another polymer which may be utilizable with the present invention, although also untried to date, is PVF. However for unknown reasons, PVF is sold only as a film, suggesting that the extrusion/melt processing of the present invention may also be unlikely with PVF.

TABLE A

| POLYMER | TENSILE MODULUS MPSI | MELTING POINT degrees F. | HARDNESS ROCKWELL = R SHORE = D |
|---|---|---|---|
| Ethylenechlorotrifluoroethylene (ECTFE) | 240 | 464 | R95; D75 |
| Ethylenetetrafluoroethylene (ETFE) | 120 | 518 | R50; D75 |
| Fluorinated Ethylene Propylene (FEP) | 50 | 554 | D60 |
| Polyvinylidene fluoride (PVDF) | 200-80,000 | 338 | R80; D80 |
| Perfluoroalkoxy (PFA) | N. A. | 580 | D64 |

The general process steps disclosed in U.S. Pat. No. 5,207,962 (incorporated herein in its entirety) are employed in the present invention with some modifications, except that the final texturizing step is an optional feature and most preferably is not utilized.

Referring to FIG. 1 of the drawing, a molten, thermoplastic web 10 is extruded through a die 12 of a conventional extruder 14. The polymers used in the present invention have varying melting points as set forth Table A and the die 12 is maintained at a sufficiently high temperature necessary to extrude the polymer as a film.

As shown in FIG. 1, the web 10 exits the die 12 in a substantially vertical orientation and immediately enters the nip 16 provided between a patterned, metal embossing roll 18 and a smooth surfaced, crowned metal backup roll 20. In accordance with this invention both the embossing roll and the backup roll preferably are maintained at a temperature in the range of between 70°-115° C., and most preferably at approximately 75° C. Moreover, it has been determined that the smooth surface of the backup roll 20 should be formed with a crown, i.e., it should be provided with a convex curvature in the axial direction of a sufficient degree to produce a film having a plurality of thin areas and/or holes, which when biaxially oriented, open to form apertures. In an exemplary embodiment the roll 20 is provided with a curvature such that the radius of the roll on the center 20A is approximately, e.g., 8-12 mils greater than the radius of the roll at each axial end 20B for a roll which is 40 inches long. The details of the crowning are described in further detail below. Suffice it to state for now that Applicants have determined that the required convex curvature is substantially greater than has heretofore been employed in prior art processes known to Applicants.

The embossed web 10 passes about the periphery of the smooth surfaced, crowned backup roll 20 and is directed through a predraw unit 30. This predraw unit is shown schematically as including four smooth surfaced metal rolls 32, 34, 36 and 38. However, the number of rolls employed does not constitute a limitation on the broadest aspects of the present invention.

In the representative embodiment of the invention the most upstream roll 32 in the predraw unit 30 is driven at a rotational speed of approximately 60 feet/minute, and each of the following rolls 34, 36 and 38 is driven at a rotational speed approximately one foot per minute faster than the immediately preceding roll; resulting in the web 10 being stretched approximately 6% in the machine direction. The primary purpose of the predraw unit is not necessarily to stretch the web, but rather to maintain tension on the web to control the process.

Figure 2:
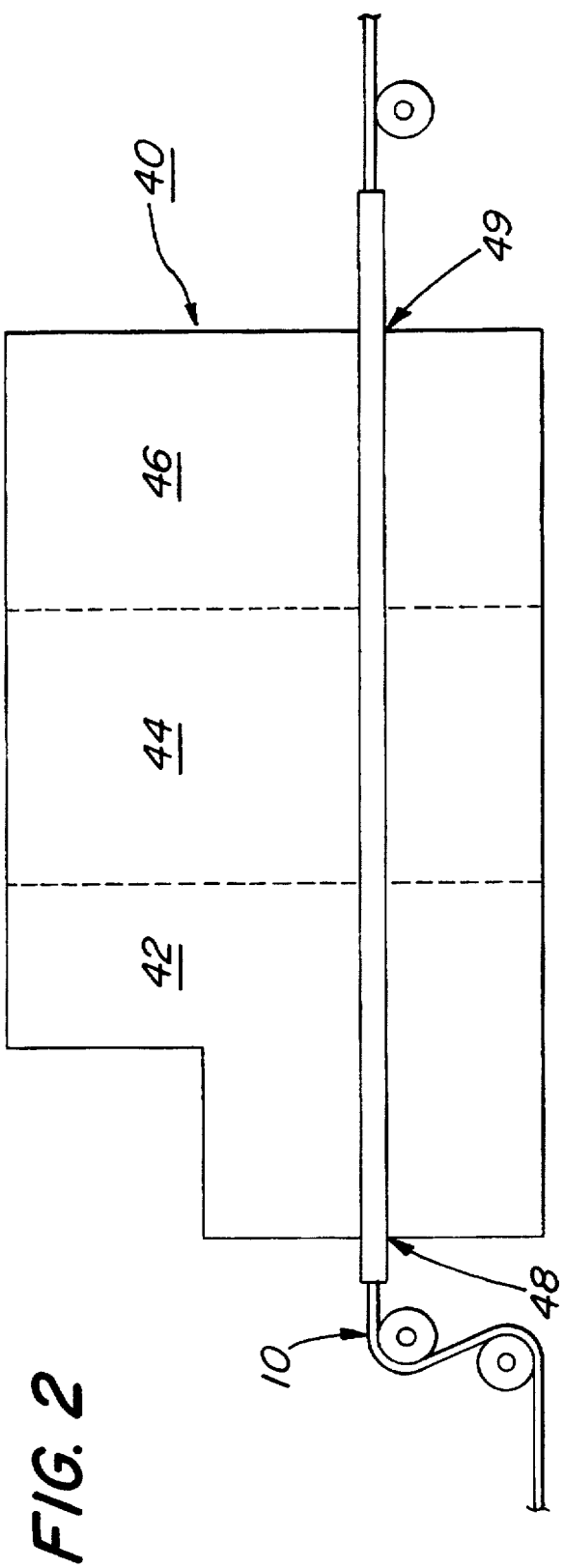

Referring to FIGS. 2 and 4, the web 10 is directed from the predraw unit 30 into a tenter unit 40 in which the web is stretched in the cross-machine direction. As is illustrated in FIG. 2, the tenter unit 40 is provided with three heated zones 42, 44 and 46, located between the entrance 48 and exit 49 thereof. The three heated zones are controlled in the range between 140°-155° C.

In accordance with a representative form of this invention the overall length of the tenter unit 40 is approximately 45 feet. The web 10 enters this unit with a cross-machine direction width of approximately 15 inches, and exits the unit with a cross-machine direction width of approximately 33 inches. Thus, the web 10 is stretched approximately 2.2 times of its entrance width (approximately 230%) between the entrance 48 and the exit 49 of the tenter unit 40. It should be noted that the tenter unit 40 can be is a conventional unit sold by Marshall and Williams in Rhode Island, and includes opposed, transversely spaced-apart chain-driven rows of clamping jaws (not shown) which are designed to automatically clamp the longitudinally extending edges of the web 10, as the web enters the tenter section at entrance 48. These jaws, as they are being moved in the machine-direction, are directed transversely away from each other in the cross-machine direction to transversely stretch the web 10, as is illustrated in FIG. 4.

Figure 3:
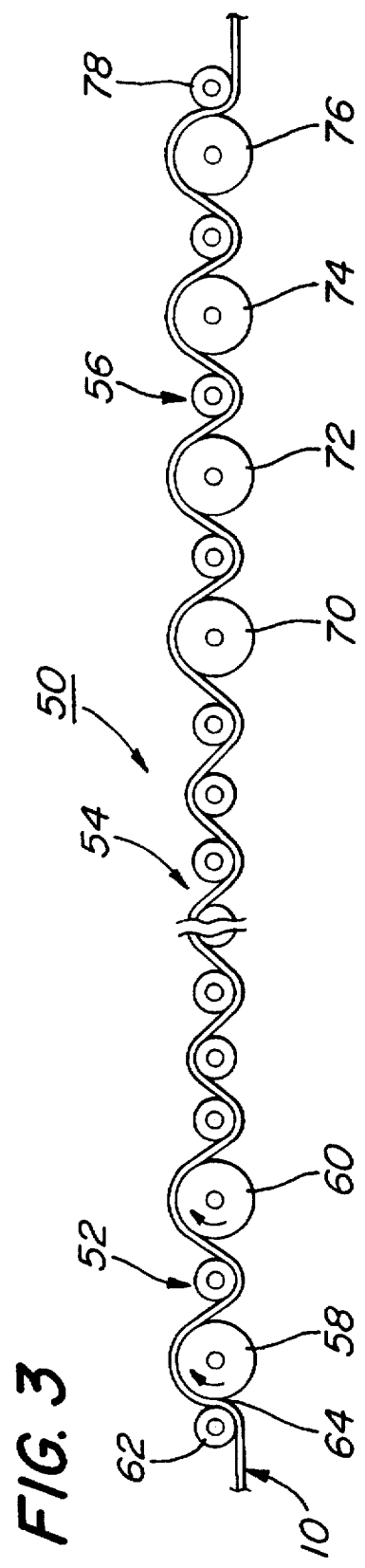

Referring to FIG. 3, after the web 10 has been stretched in the cross-machine direction in the tenter unit 40 it is directed into a machine direction stretcher unit 50. This latter stretcher unit includes an entrance section 52, an idler section 54 and an exit section 56.

The entrance section 52 includes two large driven rolls 58 and 60 (e.g., 10 inches in diameter), which preferably are driven at a speed in the range of approximately 67 feet per minute, which is the speed at which the web 10 exits the tenter section 40 at 49.

It should be noted that a small diameter roll 62 engages driven roller 58 to define a drive nip 64 at the entrance section 52, to thereby positively move the web into the stretcher unit 50 at the desired entrance speed. In a representative embodiment of this invention the rollers 58 and 60 are driven at approximately 66 feet per minute.

Still referring to FIG. 3, the exit section 56 includes a plurality of large diameter, driven rolls, four of which are illustrated at 70, 72, 74 and 76. The most downstream driven roll 76 engages roll 78 to define a nip therebetween to control the exit speed of the web 10. In accordance with a representative embodiment of this invention the speed of the driven rolls 70, 72, 74 and 76 is approximately 96 feet per minute.

Located between the entrance section 52 and exit section 56 is the idler section 54. This idler section includes a plurality of idler (non-driven) rolls which are separated from each other, but spaced close together. The number of idler rolls can be varied in accordance with this invention, with the number of idler rolls utilized in an exemplary embodiment being eleven (11).

In the illustrated embodiment the stretcher unit 50 includes four distinct and separated heated zones. Most preferably each of the heated zones is at a temperature slightly less than the melt point of the polymer.

Referring to FIG. 3, in the illustrated or representative embodiment of this invention the rolls in the entrance section 52 and the most upstream idler roll of the idler section 54 are maintained at a temperature of approximately 150° C. The idler section 54 is provided with a set of 4 (or 5) idler rolls downstream of the first idler roll, which are heated to a temperature of approximately 150° C., and an immediately subsequent, or further downstream set of 5 (or 4) idler rolls, which are maintained at a temperature of approximately 150° C. This latter set of idler rolls is followed by a single idler roll and the rolls in exit section 56, which preferably are maintained at a temperature of approximately 150° C.

In accordance with the exemplary embodiment of this invention employing stretcher unit 50, wherein the driven rolls 58 and 60 at the entrance section 52 are maintained at a speed of approximately 67 feet per minute and the driven rolls 74 and 76 at the exit section 56 are maintained at a speed of approximately 96 feet per minute, the stretcher unit 50 stretches the web 10 approximately 43% in the machine direction.

Turning now to FIGS. 5 and 6, the configuration of the embossing roll 18 will now be described in detail. Specifically, the embossing roll pattern includes a plurality of discrete pyramids 200 arranged in a repeating, preferably square pattern, as is illustrated by phantom lines in FIG. 5. However, other geometric patterns may be usable in this invention, such as hexagonal, etc. In commercial embodiments of the present invention to be used in filtration media, the square pattern is the most preferred embodiment. For example, two such square pattern embodiments resulted in a film having a number of strands per inch of 22 MD (machine direction) and 14 TD (transverse direction) and in another embodiment, 14 strands per inch MD and 14 strands per inch TD, depending upon the stretch ratios utilized.

In the most preferred form of this invention the height of the pyramids is approximately equal to or slightly greater than 0.0105 inches, and the diameter of each pyramid, at the base thereof, is approximately 0.023 inches, with the bases of adjacent pyramids being in engagement with each other.

As can be seen best in FIG. 5 phantom lines 202a and 202b, which interconnect adjacent pyramids forming part of each square, are parallel to each other and extend substantially perpendicular to the circumferential direction (i.e., machine direction) of the roller. Most preferably the circumferential spacing between adjacent phantom lines 202a and 202b is approximately 0.040 inches, resulting in a repeating pattern of approximately 25 squares per linear inch in the circumferential direction around the roll.

In accordance with broader aspects of this invention the projections are disposed in a regular geometric pattern (most preferably a square) that repeats between 10 and 125 times per inch in the circumferential direction around the roll, more preferably in the range of 20 to 90 times per inch, and most preferably in the range of 25 to 50 times per inch in the circumferential direction around the roll.

Applicants have determined that the invention of the '962 patent does not function to reliably form apertures in the web made of the fluoroplastic materials of the present invention, unless the unpatterned back-up roll is provided with a crowned surface of the type which heretofore has not been employed in forming apertured webs. In particular, in utilizing a forty-inch wide back-up roll it has been determined that the crowning needs to be in the range of 8–12 mils (1 mil=0.0254 millimeters). That is, the diameter of the roll in the center 20A, which is the largest diameter portion of the roll, is 8 to 12 mils larger than the diameter at the end of the roll 20B, which is the smallest diameter portion of the roll. There is no strict mathematical relationship between roll width and required crown. This will depend on the deformation of the embossed roll, which is in turn a function of the stiffness of the steel from which the roll is produced, its overall weight and diameter. However, what Applicants have surprisingly discovered, is that well defined, repeatable weakened areas and/or holes, can be formed in a fluoroplastic film in accordance with the present invention using known roller materials by crowning at least one of the rollers more than prior art processes. Note that in this application, the reference to a film having thin areas also includes the thin area defining a hole therethrough.

It should be noted that the fluoropolymer is extremely difficult to emboss uniformly with standard rolls that work well for polyolefins without crowns. The pressure required to emboss the fluoropolymer is high enough to deform the embossing roll (bend it) so that the matching casting roll must be modified to compensate.

In the present invention, many holes are not formed in the embossing step prior to stretching the film. Rather, thin areas in the film are made, having a thickness of from 0–40% and preferably 5–25% of the thickness of the thickest area of the film. There may be some "holes" produced in the film of the embossing step of the method of the present invention since the pressures required in the present invention are quite high. The existence of the holes in the film prior to stretching is indicated by a zero thickness level of the film. In fact, the production of many holes in the embossing step is not preferred, since the pressure required to produce such holes would presumably wear down the embossing roll which is expensive to replace.

It should be understood that the fluoroplastics utilized in this invention are denser than the various materials disclosed in the '962 patent and in the most preferred material, i.e., ECTFE, also has a higher tensile modulus than the materials disclosed in the '962 patent.

In accordance with this invention, it has been determined that the process disclosed in the '962 patent can only work to form apertured webs with the preferred fluoroplastics by crowning the roll in a very unconventional manner, as indicated earlier.

Utilizing a smooth-surfaced, metal, flat back-up roll or one crowned a minimum amount in accordance with known technology in conjunction with a patterned embossing roll does not provide a predictable pattern of apertures in the fluoroplastic web, even at an excessively high embossing pressure of 7000 pounds in a roller being 40 inches in length. Since pressures substantially lower than 7000 pounds, e.g., on the order of 2000 to 4000 pounds, are desirably used in embossing operations to form net structures, it is clear that the use of a smooth-surfaced, flat metal back-up roll simply is not viable in the formation of fluoroplastic apertured webs. In fact, applicants have determined that the use of a 5 mil to 8 mil crown does not give repeatable results in forming holes in an extruded fluoroplastic web at normal operating pressures of between 2000 to 4000 pounds in a 40 inch long roller.

However, applicants have determined that crowning the roll in the range of 8-12 mils, and preferably closer to the 12 mil limit provides a repeatable pattern of holes and/or thin areas, in an extruded fluoroplastic web with a pressure at the embossing nip of 3500 to 4000 pounds, which is not considered to be an excessively high pressure.

In accordance with this invention, the apertured nets have a thickness in the range of 2 to 12 mils; more preferably in the range of 5 to 9 mils, and most preferably in the range of 6 to 7 mils. For filter applications these nets should have a flow rate of at least 1,000 cubic feet per minute of air flow. Thickness is measured using a commercially available Ames Gauge 212.1 CW Dial indicator (or other comparable micrometer-like devices). As is well known to those skilled in the art utilizing such gauges, the key to such measurements is in defining two components, namely, the control area of the disc used and the weight applied to the film being tested. The apertured nets of the present invention were measured using a one-half inch diameter foot and a 3 ounce dead weight reading and averaging the thickness across a six-inch wide piece of net.

In accordance with the broadest aspects of this invention the material of the net structure needs to be a crystalline, thermoplastic, extrudable fluoropolymer. Most preferably, these polymers have a tensile modulus in excess of 200,000, and more preferably in excess of 225,000, as measured by ASTM D638. The most preferred fluoroplastic that applicants are aware of to date is the ECTFE, having a tensile modulus of 240,000. The fluoroplastics which would be utilizable with the present invention need to be extrudable and have sufficient crystallinity to allow a crack which forms in thin areas to propagate cleanly to form an aperture. Although Applicants do not have an exact understanding of the degree of crystallinity required for the process of the present invention, Applicants assume that the crystals are drawn into fibrillar structures which propagates a hole forming at a crack, and that therefore the material must be approximately at least 30% crystalline. A crystallinity of a lower amount leads Applicants to believe that the material would be too rubbery and tend toward film formation, rather than crack propagation.

In accordance with one preferred form of this invention the apertured web has a plurality of apertures defined by transversely spaced-apart, MD-oriented strands and longitudinally spaced-apart, transversely extending cross-directional strands, with the strands extending in one direction being thicker than the strands extending in the other direction. Providing different levels of thickness aids in spacing the nets apart in applications where the nets are employed in a laminated arrangement, such as outer supporting members for thin filter membranes.

It also should be understood that the fluoroplastic apertured net structures forming the subject matter of this invention are low thickness, high aperture-concentration net structures which are substantially different from the heavy duty, open-mesh net structures employed in fencing applications, in the construction industry to reinforce concrete, and/or in landfill applications to reinforce soil. In particular, the net structures of this invention have a Frazier number of 200-2,000, more preferably 500-1,500, and most preferably 1,000-1,200. The Frazier number is the number of cubic feet of air per minute that passes through a square foot of web at 70° F. (Fahrenheit), and at ½ inch of water pressure drop. The Frazier number is determined in accordance with the procedure published by H. Schiefer and P. Boyland, contribution no. RP1471 of the National Bureau of Standards, published in Vol. 28, pp. 637–642 of the J. Research of the National Bureau of Standards, May 1942, the entire disclosure of which is incorporated by reference herein, using the one inch table opening supplied with the machine and a 11 mm orifice for samples within the preferred range, rather than the 2.75" diameter opening described in the reference.

In accordance with this invention, the net has at least 10 strands per inch in each direction, more preferably, at least 14 strands per inch, and most preferably in excess of 20 strands per inch.

In a filter support application, due to the fragile nature of many of the filter membranes, it is important that the membrane does not have to span too large a distance between support members. Hence structures with less than about 10 strands per inch in any direction would be unsatisfactory for this application since they would allow membrane sag. Structures with low strand counts (large holes) would allow enough stress on the membranes to cause premature failure and would be unacceptable.

Measuring strand count is a typical way to characterize a net. Forming a net requires some type of symmetrical, repeating pattern of holes and/or thin areas. That pattern may be square, hexagonal, or square obliquely to the machine direction. Without such symmetry, it is difficult or impossible to control the hole opening into an aperture, hence the process. Normally, reference is made to the number of strands per linear inch in the direction(s) of symmetry. For the preferred form of the present invention this happens to be lined up with the MD and CD (or TD) direction, i.e., using a square pin pattern. Strands are measured by using a magnifying instrument which displays at least a one square inch view area of the sample at a magnification of approximately 10×. A commercially available microfiche reader with a 10× magnifying lens has been found acceptable, as have magnifiers supplied to the textile industry as pick counters.

In accordance with this invention the CKX type pattern of the '962 patent is employed, rather than the matched roll pattern identified as CSD.

The use of a patterned-embossing roll opposite a smooth surfaced back-up roll is clearly the preferred embossing system for this invention, since a smooth-surfaced backup roll is less expensive to make than a patterned back-up roll, the crowning of a smooth-surfaced roll is substantially easier than the crowning of a patterned back-up roll, and the use of a smooth-surfaced back-up roll eliminates the need for matching the patterns on opposing rolls. All of these benefits provide a more versatile processing system which is capable, with other modifications, of forming apertured net structures from a variety of different materials.

As shown in cross-section of FIG. 7, the present invention may be utilized to prepare a laminated filter structure 80. The structure 80 includes an apertured filter membrane 82. This apertured filter membrane 82 is sandwiched between an upper apertured film 84 and a lower apertured film 86 each of which is made in accordance with the present invention, and then fed through a commercially available pleating machine. Each of the layers 84 and 86 have apertures 88 therethrough. The filter membrane 82 also has a plurality of apertures (not shown) therethrough of a size suitable for the particular filtration use, which can vary depending upon the circumstances of use in accordance with the present invention. In the most preferred embodiments of this invention, the filter membrane 82 is thinner than the apertured films 84 and 86.

A pleated filter structure 90 is shown in FIG. 8 in accordance with the present invention having an upper layer 92, lower layer 94 with apertures 96 through each layer. The layers are fed through a commercially available pleating machine to achieve the pleated structure of FIG. 8 and includes a plurality of layers. Each of the apertured films forming the pleated filter structure 90 is formed from a crystalline, thermoplastic, extrudable fluoroplastic material and includes spaced-apart strand segments defining apertures 96 therebetween. In a preferred embodiment, each of the layers 92, 94 have at least 10 strand segments per inch, a thickness of 2–12 mils and a Frazier air permeability number in the range of 200–2,000.

Without further elaboration the foregoing will so fully illustrate our invention that others may, by applying current or future knowledge, adapt the same for use under various conditions of service.

We claim:

1. An extruded apertured film of a crystalline, thermoplastic, extrudable fluoroplastic material, the film including spaced-apart strand segments defining a regular geometric pattern of apertures therebetween, the film having at least 10 strand segments per inch, a thickness of 2–12 mils and a Frazier air permeability number in the range of 200–2000.

2. The film of claim 1 including a plurality of strands extending in a first direction and a plurality of strands extending in a direction different than the first direction, the strands in the first direction having a different thickness than the strands in the different direction.

3. The film of claim 2 wherein the strands in the first direction extend in the machine direction of formation and the strands in the different direction extend in the cross-machine direction of film formation, the strands in the machine direction being thicker than the strands in the cross-machine-direction.

4. The film of claim 1 wherein the fluoroplastic is ethylene-chlorotrifluoroethylene.

5. The film of claim 1 wherein the fluoroplastic has a tensile modulus in excess of 200,000.

6. The film of claim 5 wherein the fluoroplastic has a tensile modulus in excess of 225,000.

7. The film of claim 1 wherein the fluoroplastic material is selected from the group consisting of ethylene-chlorotrifluoroethylene copolymer, polychlorotrifluoroethylene, ethylene-tetrafluoroethylene copolymer, perfluoroalkoxy polymer, polyvinylidene fluoride polymer and fluorinated ethylene propylene copolymer.

8. A laminated filter structure including a filter membrane sandwiched between a pair of extruded apertured films, each of the apertured films being formed from a crystalline, thermoplastic, extrudable fluoroplastic material, each of the films including spaced-apart strand segments defining apertures therebetween, each of the films having at least 10 strand segments per inch, a thickness of 2–12 mils and a Frazier air permeability number in the range of 200–2,000.

9. The laminate of claim 8 wherein the filter membrane is a thin membrane that is thinner than each of the apertured films.

10. The laminate of claim 8 wherein each of the films includes a plurality of the strands extending in a first direction and a plurality of strands extending in a different direction, the strands in the first direction having a different thickness than the strands in the different direction.

11. The laminate of claim 8 wherein the fluoroplastic is ethylenechlorotrifluoroethylene.

12. The laminate of claim 8 wherein the fluoroplastic material employed in each of the films is selected from the group consisting of ethylene-chlorotrifluoroethylene copolymer, polychlorotrifluoroethylene, ethylene-tetrafluoroethylene copolymer, perfluoroalkoxy polymer, polyvinylidene fluoride polymer and fluorinated ethylene propylene copolymer.

13. A pleated filter structure including a filter membrane sandwiched between a pair of extruded apertured films, each of the apertured films being formed from a crystalline, thermoplastic, extrudable fluoroplastic material, each of the films including spaced-apart strand segments defining apertures therebetween, each of the films having at least 10 strand segments per inch, a thickness of 2–12 mils and a Frazier air permeability number in the range of 200–2,000.

* * * * *